Figure 1:
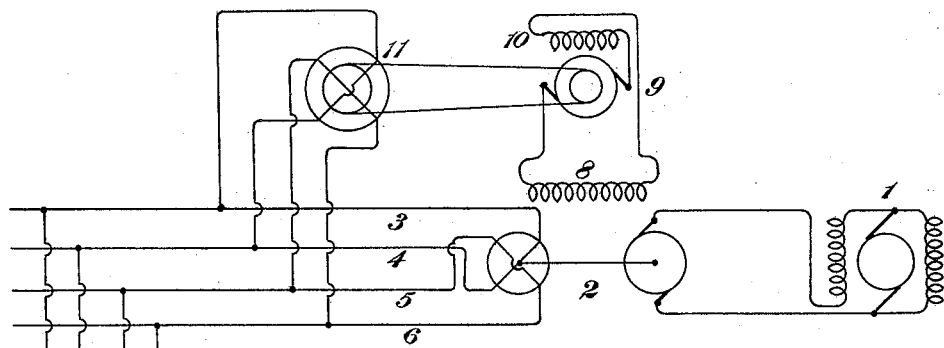

(No Model.)

B. G. LAMME.
SYSTEM OF ELECTRICAL DISTRIBUTION AND REGULATION.

No. 606,015. Patented June 21, 1898.

WITNESSES:
Ethan T. Dodds
H. C. Tener

INVENTOR
Benjamin G. Lamme
BY Wesley G. Carr
ATTORNEY.

THE NORRIS PETERS CO., PHOTO-LITHO., WASHINGTON, D. C.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION AND REGULATION.

SPECIFICATION forming part of Letters Patent No. 606,015, dated June 21, 1898.

Application filed February 10, 1898. Serial No. 669,846. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Systems of Electrical Distribution and Regulation, (Case No. 769,) of which the following is a specification.

My invention relates to the transformation of direct currents to alternating currents, and has for its object to provide a method and a means whereby the speed of the rotary transformer employed may be maintained substantially constant irrespective of changes in the amount of inductive load on the alternating-current circuit.

It is well known that a rotary transformer employed in transforming alternating to direct currents has a certain definite speed which is determined by the rate of alternations of the current supplied to its alternating-current terminals. The speed therefore remains constant even though the electromotive force be varied, provided the rate of alternations is not changed. This transformation from alternating currents to direct currents is the one most usually practiced; but it sometimes occurs that a demand is made for alternating current for driving induction-motors or for other purposes where the only readily-available source of current is a direct-current generator or a plant embodying several such generators. Under such conditions it becomes necessary, in order to utilize the existing plant, to transform some or all of the direct current to alternating current. It is of course desirable to employ a rotary transformer for this purpose; but with such reversed operation of the rotary transformer the rate of alternations of the current obviously depends upon the speed of the armature, and this in turn is dependent upon the field-magnet strength and the direct-current electromotive force supplied to the armature. If the rotary transformer is delivering an alternating current that is in step with its electromotive force, the armature reactions of the direct current are opposed to and practically neutralize those of the alternating current. Under this condition the rate of alternations of the alternating current will remain practically constant notwithstanding variations in the load, provided the field-charge and the applied direct-current electromotive force remain constant; but if the alternating current is not in step with its electromotive force there will be two components, one of which is in step with the electromotive force and is represented by the direct current supplied to the transformer and the other of which is at right angles to the electromotive force and is not represented by any corresponding direct current. This right-angled component may be either a leading or a lagging current and will react upon the field-magnet so as to magnetize or demagnetize it, as the case may be. If it exerts a magnetizing effect, it strengthens the field-magnet, and the speed of the rotary transformer decreases. If it demagnetizes the field-magnet, the speed of the transformer will increase. Therefore if the alternating-current circuit carries an inductive load—such, for example, as induction-motors—which changes from time to time, the variations in the amount of inductive load will cause variations in the speed of the transformer, which will in turn vary the speed of the motors driven by it. In order to obviate this variation in speed with changes in the amount of inductive load, I propose to employ a small direct-current generator for exciting the field-magnet of the rotary transformer, which may have either a shunt, a series, or a compound winding, but which must be normally operated to produce an electromotive force which corresponds to a degree of field-magnet excitation very much below saturation. This exciting-generator is driven either by an alternating-current motor, which is in turn driven by current supplied by the rotary transformer, or it is belted directly to the rotary transformer. If the amount of the alternating-current inductive load on a rotary transformer changes so that the rate of alternations decreases, for example, then the exciting-generator and the motor driving the same will also decrease in speed. This action will also decrease the exciting electromotive force of the rotary transformer, and as the exciter is unsaturated a small drop in speed will produce a relatively large drop in the electromotive force. This lowering of the exciting electromotive force will thus weaken the field of the rotary transformer and effect an increase of its armature speed up to near the normal. On the other hand, an increase in speed of the rotary transformer will be accompanied by an increase in the exciting electromotive force which will act immediately to lower the speed of the transformer.

Figure 2:
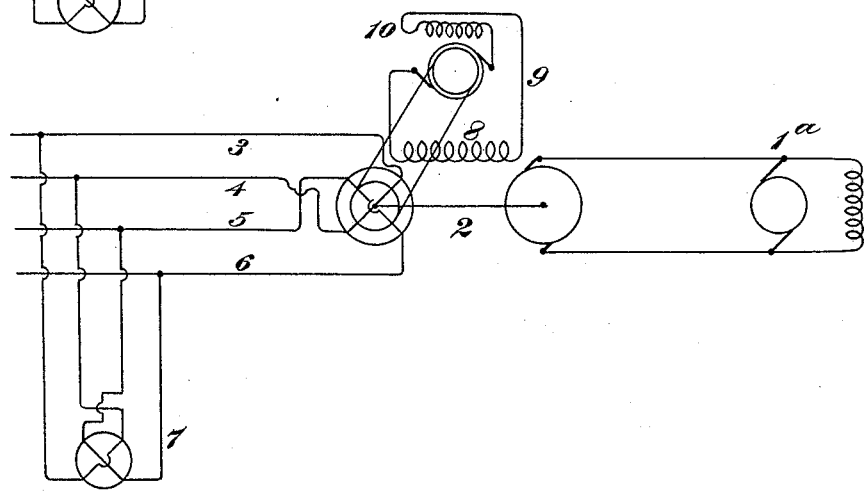

In the accompanying drawings, Figure 1 is a diagram of a system embodying my invention, and Fig 2 is a similar diagram of a modification.

Referring particularly to Fig. 1, 1 is a direct-current generator which may have any suitable type of field-magnet winding, that shown being of the compound variety. 2 is a rotary transformer receiving direct current from a generator 1 and supplying alternating current to the mains 3, 4, 5, and 6. 7 is a two-phase motor, which represents the inductive load upon the alternating-current circuit. The field-magnet winding 8 of the rotary transformer 2 is shown as excited by a direct-current generator 9, having a series field-magnet winding 10, this probably being the most desirable winding for this system, although the invention is not limited in this respect. The armature of the generator 9 is shown as belted to a small two-phase motor 11, which receives its driving-current from the mains 3, 4, 5, and 6. The operation of this system effects a substantially constant speed of the rotary transformer notwithstanding changes in the amount of inductive load on the alternating-current circuits supplied by it, as has been already set forth.

In Fig. 2 the main direct-current generator 1ª is shown as a shunt-wound machine and the rotary transformer 2 as having a field-magnet winding 8, excited by a direct-current generator 9, having a series field-magnet winding 10, the same as in the form illustrated in Fig. 1. The alternating-current circuits 3, 4, 5, and 6 are also shown as provided with an inductive load, represented by a two-phase motor 7. In this organization of apparatus, however, the exciting-generator 9 is belted directly to the rotary transformer instead of being driven by a separate motor, as in the other form. It has been found in practice that this method gives very satisfactory results, and that the variations in speed of the rotary transformer are less than one-tenth as great as is the case when the transformer is operated as a shunt-wound machine.

I claim as my invention—

1. A system of distribution comprising a direct-current generator, a rotary transformer receiving current therefrom and supplying alternating currents to translating devices, a generator for exciting the field-magnet of said rotary transformer and means dependent upon changes in the amount of inductive load on the alternating-current circuit or circuits for automatically varying the speed of the exciting-generator.

2. An electrical transforming and distributing system, a source of direct currents, a rotary transformer receiving current from said source and supplying alternating-current translating devices, a direct-current generator for exciting the field-magnet of said rotary transformer and means for automatically varying the speed of the exciting-generator as the amount of inductive load on the alternating-current circuit varies.

3. In an electrical transforming and distributing system, the combination with a source of direct current, a rotary transformer, an exciting-generator for the field-magnet of such transformer operated to produce an electromotive force corresponding to a field-magnet excitation much below saturation and means for controlling the speed of said exciter in accordance with changes in the amount of inductive load on the alternating-current circuit or circuits supplied by the rotary transformer.

4. The method of maintaining constant speed in a rotary transformer for transforming direct to alternating currents, which consists in exciting its field-magnet by a direct-current generator and varying the speed of such generator as the amount of inductive load on the alternating-current circuit varies.

In testimony whereof I have hereunto subscribed my name this 8th day of February, A. D. 1898.

BENJ. G. LAMME.

Witnesses:
WESLEY G. CARR,
H. C. TENER.